(12) United States Patent
Lu et al.

(10) Patent No.: US 8,406,297 B2
(45) Date of Patent: Mar. 26, 2013

(54) SYSTEM AND METHOD FOR BIT-ALLOCATION IN VIDEO CODING

(75) Inventors: Taoran Lu, Gainesville, FL (US);
Zhifeng Chen, Gainesville, FL (US);
Dapeng Oliver Wu, Gainesville, FL (US); Yu Huang, Plainsboro, NJ (US);
Jun Tian, Plainsboro, NJ (US); Hong Heather Yu, West Windsor, NJ (US)

(73) Assignee: FutureWei Technologies, Inc., Plano, TX (US)

( * ) Notice: Subject to any disclaimer, the term of this patent is extended or adjusted under 35 U.S.C. 154(b) by 855 days.

(21) Appl. No.: 12/553,775

(22) Filed: Sep. 3, 2009

(65) Prior Publication Data

US 2010/0098162 A1    Apr. 22, 2010

Related U.S. Application Data

(60) Provisional application No. 61/106,442, filed on Oct. 17, 2008.

(51) Int. Cl.
*H04N 7/26* (2006.01)

(52) U.S. Cl. ............... 375/240.13; 375/240.03

(58) Field of Classification Search ............ 375/240.03, 375/240.12, 240.02, 240.08, 240.18, 240.05, 375/240.1, 240.13; 382/243; 725/19; 348/14.13
See application file for complete search history.

(56) References Cited

U.S. PATENT DOCUMENTS

| | | | |
|---|---|---|---|
| 8,000,389 B2 | 8/2011 | Ducloux et al. | |
| 8,243,797 B2 * | 8/2012 | Lin et al. | 375/240.05 |
| 2005/0024487 A1 * | 2/2005 | Chen | 348/14.13 |
| 2005/0276323 A1 * | 12/2005 | Martemyanov et al. | 375/240.03 |
| 2006/0140270 A1 * | 6/2006 | Li et al. | 375/240.12 |
| 2006/0215753 A1 * | 9/2006 | Lee et al. | 375/240.08 |
| 2006/0215766 A1 | 9/2006 | Wang et al. | |
| 2006/0238444 A1 | 10/2006 | Wang et al. | |
| 2007/0113242 A1 * | 5/2007 | Fetkovich | 725/19 |
| 2007/0189623 A1 * | 8/2007 | Ryu | 382/243 |
| 2008/0151997 A1 * | 6/2008 | Oguz | 375/240.02 |
| 2008/0225944 A1 * | 9/2008 | Pore et al. | 375/240.03 |
| 2008/0240250 A1 * | 10/2008 | Lin et al. | 375/240.18 |

FOREIGN PATENT DOCUMENTS

| | | |
|---|---|---|
| CN | 1615019 A | 5/2005 |
| CN | 1819658 A | 8/2006 |

OTHER PUBLICATIONS

Chai, D., et al., "Foreground/Background Bit Allocation for Region-of-Interest Coding," Image Processing, 2000, IEEE, pp. 923-926.
Chen, M-J., et al., "ROI Video Coding Based on H.263+ with Robust Skin-Color Detection Technique," IEEE Transactions on Consumer Electronics, 2003, pp. 44-45.

(Continued)

*Primary Examiner* — Jeffrey M Rutkowski
*Assistant Examiner* — Syed M Bokhari
(74) *Attorney, Agent, or Firm* — Slater & Matsil, L.L.P.

(57) ABSTRACT

A system and method for region-of-interest-based bit-allocation scheme for video coding is provided. A method for encoding an image sequence of inter-frames and intra-frames includes grouping the inter-frames and the intra-frames in at least one group of pictures (GOP), and performing a frame-level bit-allocation to inter-frames and the intra-frames in the GOP. For each frame of the inter-frames and the intra-frames in the GOP, the method also includes partitioning the frame into a plurality of macroblocks, identifying macroblocks in the plurality of macroblocks as having regions of interest (ROI), and performing a macroblock level bit-allocation for the frame based on macroblocks identified as having ROI. The method further includes encoding the image sequence based on the bit-allocations, thereby producing an encoded image sequence, and outputting the encoded image sequence.

22 Claims, 5 Drawing Sheets

OTHER PUBLICATIONS

Liu, Y., et al., "Region-of-Interest Based Resource Allocation for Conversational Video Communication of H.264/AVC," IEEE Transactions on Circuits and Systems for Video Technology, vol. 18, No. 1, Jan. 2008, pp. 134-139.

"Notification of Transmittal of the International Search Report and Written Opinion," International Application No. PCT/CN2009/074465, Applicant: Huawei Technologies Co., Ltd., et al., mailing date: Jan. 28, 2010, 11 pages.

* cited by examiner

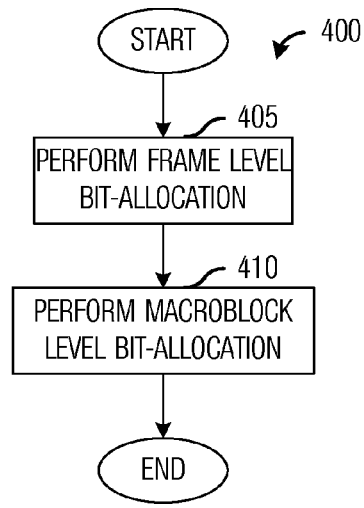
Fig. 4
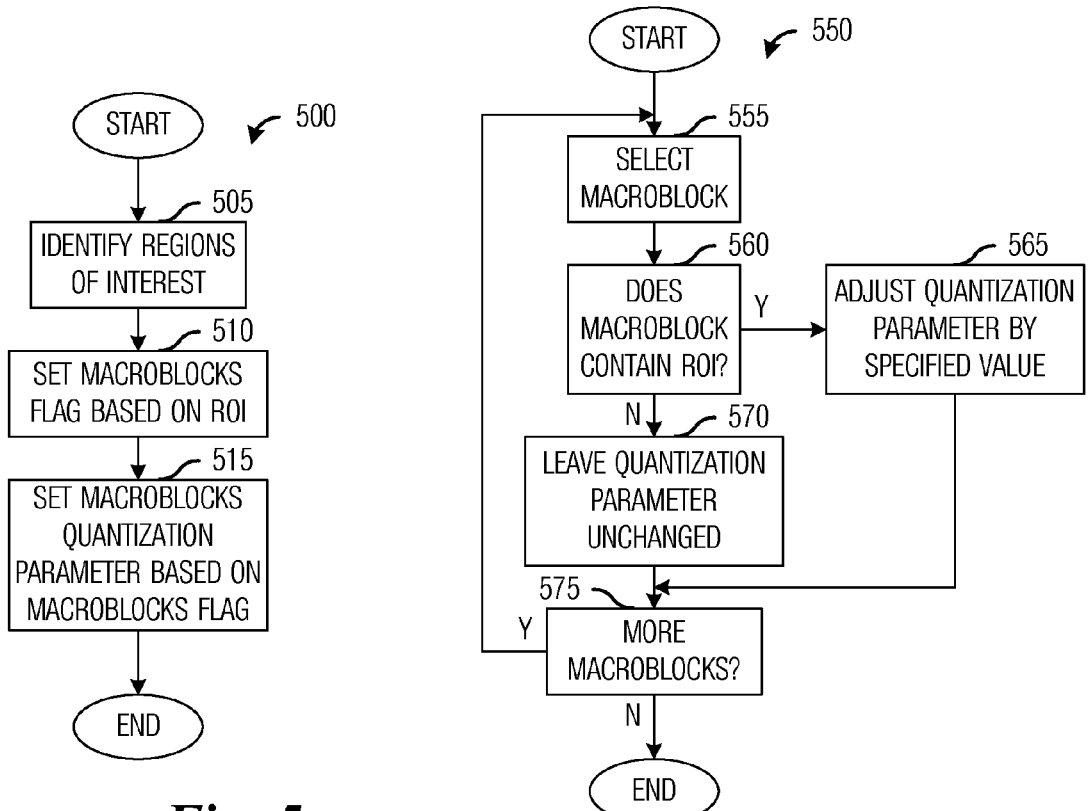
Fig. 5a
Fig. 5b

SYSTEM AND METHOD FOR BIT-ALLOCATION IN VIDEO CODING

This application claims the benefit of U.S. Provisional Application No. 61/106,442, filed on Oct. 17, 2008, entitled "Region-of-Interest-Based Bit-Allocation Scheme for H.264/AVC," which application is hereby incorporated herein by reference.

TECHNICAL FIELD

The present invention relates generally to visual communications, and more particularly to a system and method for a bit-allocation scheme for video coding.

BACKGROUND

In recent years, video coding (video compression) has become one of the widely explored topics in the field of visual communications. With the rapid development of video and multimedia technologies, digital video applications are becoming more important in people's lives. The demand for digital video communication, such as Internet Protocol Television (IPTV), MobileTV, video gaming, video surveillance, videoconferencing, mobile video broadcasting and videophone, and so forth, has increased considerably thanks to the success of advanced video coding techniques, such as H.264, MPEG-4, etc.

The state-of-the-art coding schemes have greatly improved the coding efficiency and subjective visual quality. However, due to the scarcity of channel resources and the restriction of transmission rates, further improving H.264 coding efficiency and encoding video sequences at very low bit-rates with good quality remain major challenges. Thus, the pursuit of performance improvement continues. Many coding schemes consider the property of the human visual systems and try to introduce the concept of region-of-interest (ROI) to improve the coding efficiency and error resiliency of the existing standards.

SUMMARY OF THE INVENTION

These and other problems are generally solved or circumvented, and technical advantages are generally achieved, by embodiments of a system and method for a region-of-interest-based bit-allocation scheme for video coding.

In accordance with an embodiment, a method for encoding an image sequence is provided. The image sequence comprises inter-frames and intra-frames. The method includes grouping the inter-frames and the intra-frames into at least one group of pictures (GOP), and performing a frame-level bit-allocation for the inter-frames and intra-frames in the GOP. The method also includes for each frame of the inter-frames and the intra-frames in the GOP, partitioning the frame into a plurality of macroblocks, identifying macroblocks in the plurality of macroblocks as having regions of interest (ROI), and performing a macroblock level bit-allocation for the frame based on macroblocks identified as having ROI. The method further includes encoding the image sequence based on the bit-allocations, thereby producing an encoded image sequence, and outputting the encoded image sequence.

In accordance with another embodiment, a method for encoding a group of pictures (GOP) is provided. The GOP comprises at least one inter-frame and at least one intra-frame. The method includes distributing a total number of encoding bits available to encode the GOP to the inter-frame and the intra-frame, and for each frame in the GOP, partitioning the frame into a plurality of macroblocks, identifying macroblocks in the plurality of macroblocks as having regions of interest (ROI), and distributing an allocated number of encoding bits allocated to encode the frame to the encoding of each macroblock in the plurality of macroblocks. The distributing an allocated number of bits is based on the macroblocks identified as having ROI. The method also includes encoding the GOP based on the distributed encoding bits, thereby producing an encoded GOP, and outputting the encoded GOP.

In accordance with another embodiment, an encoder is provided. The encoder includes a transform unit (TU) coupled to an input buffer, an inverse transform unit (ITU) coupled to the TU, a motion estimation unit (MEU) coupled to the input buffer, and an intra-frame prediction unit (IPU) coupled to the ITU. The encoder also includes a motion compensation unit (MCU) coupled to the ITU, a coding unit (CU) coupled to the TU, and a controller coupled to the TU, the MEU, and the CU. The TU applies a transform to a residue. The residue is based on image data of a frame provided by the input buffer. The ITU applies an inverse transform to an output of the TU, and the MEU computes motion vectors for the frame provided by the input buffer based on a reference frame. The IPU predicts intra-frame information based on the frame, and the MCU generates a description of the frame based on a reference frame and motion present in the frame, the CU encodes the frame provided by the input buffer. The controller generates control signals to control the operation of the encoder, where the control signals are based on a frame type of the frame provided by the input buffer and regions of interest (ROI) present in the frame.

An advantage of an embodiment is that region of interest based bit-allocations are used in the encoding of both I-frames and P-frames.

A further advantage of an embodiment is that existing decoders may be used without modification, which may help to accelerate acceptance and use of the embodiments.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which:

FIG. 4 is a flow diagram of operations in a two-level bit-allocation for use in encoding images;
FIG. 5a is a flow diagram of operations in macroblock level bit-allocation for an I-frame;
FIG. 5b is a flow diagram of operations in setting macroblock quantization parameters of macroblocks of an I-frame based on macroblock flags;

DETAILED DESCRIPTION OF ILLUSTRATIVE EMBODIMENTS

Figure 1:
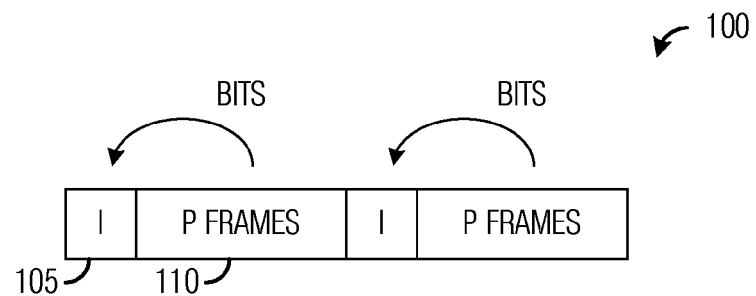
FIG. 1 is a diagram of a first level bit-allocation.

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a visual communications system compliant to ITU-T Video Coding Experts Group (VCEG) H.264 coder/decoder (codec). The invention may also be applied to other visual communications systems making use of block-oriented motion-compensation-based codecs.

A group-of-pictures (GOP) structure may be utilized to compensate the compensation of bits between I-frames and P-frames in a single GOP. An I-frame may also be referred to as an intra-frame since the encoding of an I-frame depends only on information contained within the I-frame itself and not on any other frame in the GOP. An I-frame may also be referred to as a reference frame. While a P-frame may also be referred to as an inter-frame since the encoding of a P-frame may depend on information contained in other frames, such as an I-frame or P-frame. There may be more than one I-frame or P-frame in the GOP.

A single frame (either I-frame or P-frame) may be partitioned into a number of macroblocks, with the number of macroblocks being dependent on factors such as processing power, bit rate, desired quality after encoding, adherence to a technical standard, and so forth. The macroblocks in a frame may all be the same size. However, in a different implementation, the macroblocks may differ in size. For example, in the middle of a frame, where a viewer typically will focus greater attention, the macroblocks may be smaller. While on the edges of a frame, where there is typically not as much visually valuable information, the macroblocks may be larger. Typically, a macroblock will be square or rectangular in size. However, macroblocks of different shapes are possible. Furthermore, a single frame may be partitioned in macroblocks of different sizes and shapes.

At the macroblock level, different quantization parameters (QP) may be used for different macroblocks. For example, finer QPs may be used in the encoding of macroblocks containing more visually valuable information, while coarser QPs may be used in the encoding of macroblocks containing less visually valuable information. The use of finer QPs may imply that more bits may be allocated to the representation of the visual information being encoded.

A two-level bit-allocation based on a GOP structure is provided. A first level bit-allocation may be on a frame level, and a second level bit-allocation may be on a macroblock level. Since an I-frame may be used as a reference frame for motion estimation in succeeding P-frames, the quality of the I-frame may be a dominant factor in the peak signal-to-noise ratio (PSNR) of a GOP. Furthermore, generally in a frame, portions of the frame designated as ROI may contribute more to a quality (both real and perceived) of the frame than portions of the frame not designated as ROI (i.e., non-ROI). Therefore, a compensation of bit-consumption between I-frame and P-frame (i.e., the first level bit-allocation) and between ROIs and non-ROIs (i.e., the second level bit-allocation) of an I-frame and P-frame may bring benefits such as PSNR improvement while maintaining a bit target.

FIG. 1 illustrates a first level bit-allocation. As discussed above, the first level bit-allocation may be on a frame level and may involve I-frames and P-frames of a GOP 100. GOP 100 includes I-frames 105 and P-frames 110. Since I-frames may be used as the basis for later P-frames, more bits may be allocated to the encoding of I-frames than to the encoding of P-frames. Bits that may be allocated to the encoding of P-frames may also be re-allocated to the encoding of I-frames.

Figure 2:
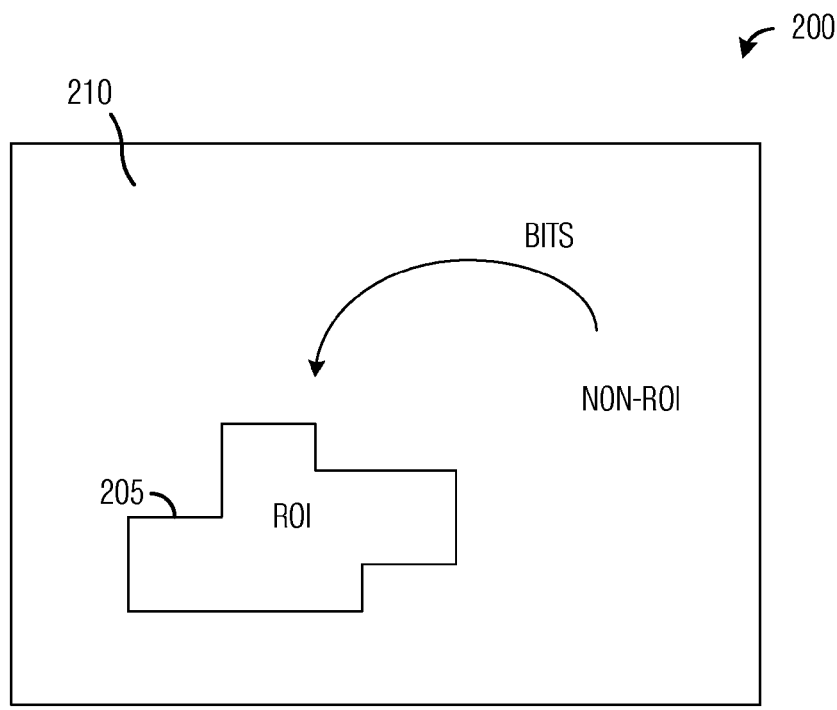
FIG. 2 is a diagram of a second level bit-allocation.

FIG. 2 illustrates a second level bit-allocation. As discussed previously, portions (macroblocks) of the frame designated as ROI may contribute more to the real and perceived quality of the frame than portions of the frame not designated as non-ROI. As shown in FIG. 2, a frame 200 includes one or more macroblocks 205 designated as ROI, while remaining macroblocks are designated as non-ROI. Since the macroblocks designated as ROI may have a greater impact on the quality of the frame, more bits may be allocated to the encoding of the macroblocks designated as ROI than to the encoding of the macroblocks designated as non-ROI. Furthermore, bits that may be allocated to the macroblocks designated as non-ROI may be re-allocated to the encoding of the macroblocks designated as ROI.

Figure 3:
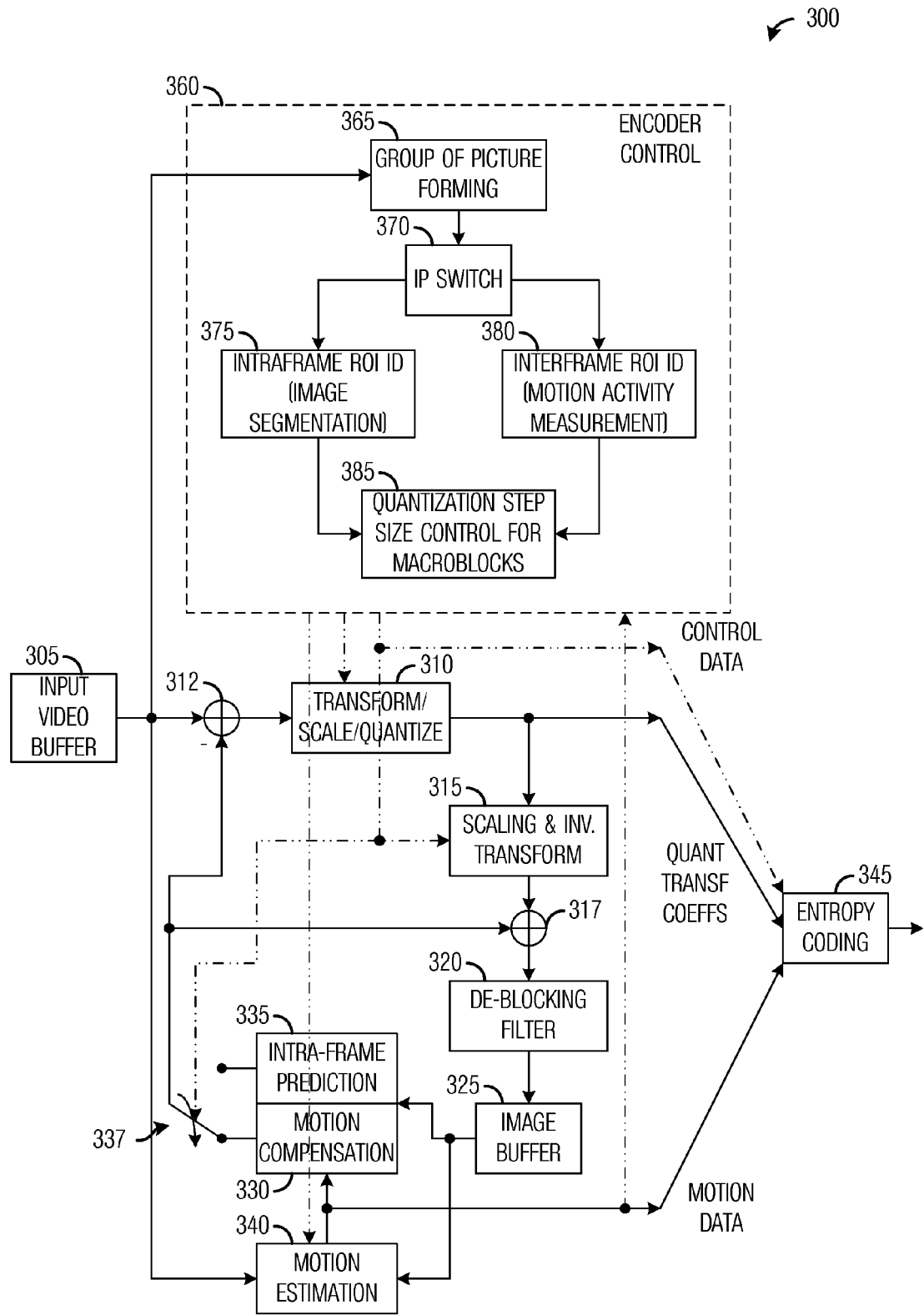
FIG. 3 is a diagram of an encoder.

FIG. 3 illustrates an encoder 300, wherein encoder 300 implements a two-level bit-allocation based on a GOP structure. Encoder 300 includes a video input buffer 305 that may be used to store incoming frames (either I-frames or P-frames). The incoming frame may or may not already be partitioned into macroblocks. If not already partitioned into macroblocks, encoder 300 may include a partitioning unit to partition the images into macroblocks.

Encoder 300 also includes a transform/scale/quantize unit 310 that may be used to implement a discrete cosine transform, for example. Transform/scale/quantize unit 310 may also perform scaling and quantizing on transformed residue data, wherein residue data is a difference between image data provided by video input buffer 305 and motion compensation information provided by a motion compensation unit 330 or intra-frame prediction information provided by an intra-frame prediction unit 335. Transform/scale/quantize unit 310 may be used to achieve the reduction in the size of the incoming frames. An adder 312 may be used to subtract from the image data provided by input video buffer 305 motion compensation information provided by motion compensation unit 330 or intra-frame prediction information provided by intra-frame prediction unit 335 to produce a residue. The information (either motion compensation information or intra-frame prediction information) may be selected based on the nature of the frame being encoded (i.e., I-frame or P-frame) as well as the image in the frame itself. The operation of motion compensation unit 330 and intra-frame prediction unit 335 will be discussed below.

Encoder 300 further includes a scaling and inverse transform unit 315. Scaling and inverse transform unit 315 may be used to reverse the operations of transform/scale/quantize unit 310, such as implementing an inverse discrete cosine transform as well as inverse scaling, for example. An adder 317 may be used to combine the output of scaling and inverse transform unit 315 with motion compensation information provided by motion compensation unit 330 or intra-frame prediction information provided by intra-frame prediction unit 335. While a deblocking filter 320 may be used to smooth sharp edges that may appear when the macroblocks are separately encoded. The smoothing of the sharp edges may improve image quality. Output of deblocking filter 320 may be stored in an image buffer 325.

The images stored in image buffer 325 may be provided to motion compensation unit 330 that may be used to generate a description of a frame by referencing a reference frame and describing the motion present in the frames. Motion compensation unit 330 may also receive input from a motion estimation unit 340 which estimates the motion present in the frames. Frames stored in image buffer 325 may also be provided to intra-frame prediction unit 335 that may be used to predict intra-frames from the frame currently being processed.

Outputs of motion compensation unit 330 and intra-frame prediction unit 335 may be provided to a switch 337 which may selectively couple either output to adders 312 and 317. A state of switch 337 may be defined by a control signal based on a frame in input video buffer 305. For example, if an I-frame is in input video buffer 305, then switch 337 may select the output from intra-frame prediction unit 335, while switch 337 may select the output from motion compensation unit 330 if a P-frame is in input video buffer 305.

Encoder 300 also includes an entropy coding unit 345 that may implement a lossless data compression algorithm. For H.264/AVC, there may be two types of entropy coding implemented in entropy coding unit 345: context-based adaptive binary arithmetic coding (CABAC) and variable-length coding (VLC). Entropy coding unit 345 combines outputs from transform/scale/quantize unit 310 and motion estimation information from motion estimation unit 340 to encode frames.

Encoder 300 may be coupled to an encoder control 360. Encoder control 360 may be responsible for controlling the operations of the various units in encoder 300 based on the nature of the images being encoded, i.e., I-frames or P-frames. For example, encoder control 360 may generate control signals to control the operation of units in encoder 300. A control signal generated by encoder control 360 may select a state of switch 337. A control signal may also be used to control the operation of scaling and inverse transform unit 315 as well as entropy coding unit 345. Encoder control 360 may be integrated with encoder 300 in a single integrated circuit or encoder control 360 may be on a different integrated circuit from encoder 300.

Encoder control 360 includes a group of picture (GOP) forming unit 365. GOP forming unit 365 may be coupled to an output of video input buffer 305. GOP forming unit 365 may be used to form a GOP structure from I-frames and P-frames from frames provided by input video buffer 305. GOP forming unit 365 may provide control signals to units within encoder 300 indicating the start and/or stop of GOPs, for example. GOP forming unit 365 may also provide I-frames and P-frames to other units in encoder control 360.

Encoder control 360 also includes an I-frame/P-frame (IP) switch 370. IP switch 370 may be used to route I-frames or P-frames from GOP forming unit 365 to either an intraframe ROI identification unit 375 or an interframe ROI identification unit 380. According to a preferred embodiment, if a frame being provided by GOP forming unit 365 is an I-frame, then the I-frame may be routed to intraframe ROI identification unit 375 by IP switch 370, while if the frame is a P-frame, then the P-frame may be routed to interframe ROI identification unit 380 by IP switch 370.

Intraframe ROI identification unit 375 may be used to identify ROI(s) in an I-frame. Intraframe ROI identification unit 375 may use any of a variety of techniques to identify ROI(s), including but not limited to skin color detection, level set segmentation, principal component analysis (PCA), face detection, and so forth. For example, if a macroblock contains a ROI(s), then the macroblock may be indicated as containing a ROI(s). If multiple macroblocks contain ROI(s), then the multiple macroblocks may be indicated as containing ROI(s).

Interframe ROI identification unit 380 may be used to identify ROI(s) in a P-frame. Interframe ROI identification unit 380 may use any of a variety of techniques to identify ROI(s), including but not limited to measuring motion and activity in reference to a reference frame, such as an I-frame, and so forth. Examples of other techniques that may be used to identify ROI(s) may include computing a difference in signal energy present in a frame, optical flow, and so forth. Interframe ROI identification unit 380 may make use of motion information provided by motion estimation unit 340 in its identifying of ROI(s).

Output from both intraframe ROI identification unit 375 and interframe ROI identification unit 380 may be provided to a quantization step size control for macroblocks unit 385. Quantization step size control for macroblocks unit 385 may be used to set a quantization step size used in the encoding of the I-frames and the P-frames. Typically, quantization step size is a user configurable value that has a large impact on image quality as well as bit-allocation used in the encoding of the frames. Generally, if the quantization step size is small, then the image quality may be high due to smaller quantization errors at the cost of a large bit-allocation, while if the quantization step size is large, then the image quality may be low due to larger quantization errors at the benefit of a small bit-allocation.

FIG. 4 illustrates a flow diagram of operations 400 in a two-level bit-allocation for use in encoding images. Operations 400 may be indicative of operations taking place in an encoder, such as encoder 300, where the allocation of bits for use in encoding images is based on a GOP structure. Operations 400 may take place while encoder 300 is being used to encode images to be used for visual communications. Operations 400 may be performed in real-time, such as when a video broadcast is being encoded and transmitted to viewers. Operations 400 may also be performed in non-real-time, such as when video is being encoded for viewing at a later time or date.

Operations 400 may begin with encoder 300 performing a frame level bit-allocation in a GOP structure (block 405). In a frame level bit-allocation, available bits may be allocated to I-frames and P-frames in the GOP structure. In general, since I-frames may be used as reference frames for the encoding and decoding of P-frames, more bits may be allocated to the encoding of I-frames than for the P-frames. Additionally, the frame level bit-allocation may also be used to alter an existing bit-allocation for I-frames and/or P-frames. For example, an existing bit-allocation for P-frames may be decreased to allow for the allocation of additional bits to I-frames, and vice versa.

Typically, a frame level bit-allocation may be performed periodically rather than continually. Once a frame level bit-allocation is performed, the same frame level bit-allocation may be used for a number of frames or GOPs. Alternatively, a frame level bit-allocation may be performed on a per GOP basis. The more frequent frame level bit-allocations may allow for an optimization of allocation of bits to maximize image quality.

Once the frame level bit-allocation is complete, then a macroblock level bit-allocation may be performed (block 410). The macroblock level bit-allocation may be performed on a frame by frame basis and may or may not be performed based on information from previous frames depending on the type of frame being encoded. For example, if an I-frame is being encoded, then the encoding of the I-frame may be based solely on the I-frame itself, independent of information from other frames. However, if a P-frame is being encoded, then the encoding of the P-frame may be based on information from a previous frame, such as a reference frame, an I-frame, or so forth.

The macroblock level bit-allocation may be performed for each frame being encoded. This may imply that the macroblock level bit-allocation be performed continually while encoder 300 is in operation, as long as encoder 300 receives images (frames) to be encoded. Some processing saving techniques may be used to help reduce computational overhead. For example, the macroblock level bit-allocation may be performed for every other (or every n-th) consecutive P-frame. However, to maximize image quality, every I-frame should undergo macroblock level bit-allocation. Operations 400 may continue until there are no more images to encode or encoder 300 operations are stopped.

FIG. 5a illustrates a flow diagram of operations 500 in macroblock level bit-allocation for an I-frame. Operations 500 may be indicative of operations taking place in an encoder, such as encoder 300, as encoder 300 performs a macroblock level bit-allocation for use in encoding an I-frame. Operations 500 may occur each time that an I-frame is received for encoding. Alternatively, operations 500 may occur once for every n-th I-frame received for encoding. By skipping I-frames, computing resources may be saved at the cost of potentially reducing image quality.

As stated previously, the encoding (and decoding) of an I-frame is not dependent on information from any previous frame. Therefore, the macroblock level bit-allocation and encoding of an I-frame may be based solely on the content of the I-frame. In general, when a viewer views a video comprised of multiple frames, the viewer pays attention mainly to a region of interest (ROI) instead of an entirety of each of the frames making up the video. Therefore, it may be possible to reduce the amount of bits allocated to encoding a frame by reducing the bit-allocation to portions of a frame that is non-ROI, while maintaining a reasonably high bit-allocation for ROI portions of a frame.

This form of bit-allocation requires the use of a technique for identifying ROI in frames to identify ROI in the I-frames (block 505). I-frame ROI identification may be performed using many different techniques, such as skin color detection, level set segmentation, principal component analysis (PCA), face detection, and so forth. Furthermore, it may be possible to use multiple techniques in the identification of ROI.

The identifying of ROI may follow the definition of macroblocks. For example, if the macroblocks for an I-frame are arranged in a grid pattern, then the identification of ROI may occur by examining image data contained in each macroblock. Alternatively, image data of the entire I-frame may be examined and then the macroblocks may be defined based on identified ROI.

For I-frames with macroblocks defined prior to ROI identification, a simplifying assumption may be that if a macroblock contains a ROI, then the entirety of the macroblock may be considered to be a ROI. Therefore, if a ROI spans several macroblocks, then each of the macroblocks encompassing the ROI may be considered to be ROI. Similarly, if a ROI encompasses only a fraction of a single macroblock, the entire macroblock may still be considered to be ROI.

After ROI identification, the macroblocks containing ROI may be marked as ROI by setting a flag associated with each macroblock (block 510). For example, each macroblock may have a ROIflag to indicate if the macroblock has been identified as a ROI. If a macroblock's ROIflag is set to true, then the macroblock has been identified as a ROI, while if the macroblock's ROIflag is set to false, then the macroblock has not been identified as a ROI (or simply, non-ROI).

The macroblock level bit-allocation may take advantage of ROI information and allocate more resources (bits) to macroblocks identified as ROI, while potentially reducing resources (bits) to macroblocks identified as non-ROI. As discussed previously, allocating more (or less) resources to a macroblock may be realized by adjusting quantization parameters (such as quantization step size, for example) for the macroblock. More resources may be allocated to a macroblock identified as ROI by decreasing the quantization parameters, while fewer resources may be allocated to a macroblock identified as non-ROI by increasing the quantization parameters.

Each macroblock in the I-frame may have its quantization parameters set based on its own ROIflag (block 515). For example, if a macroblock has been identified as ROI, i.e., ROIflag=true, then the quantization parameters for the macroblock may be set at a first level, while if the macroblock has been identified as non-ROI, i.e., ROIflag=false, then the quantization parameters for the macroblock may be set at a second level, where the first level is smaller than the second level.

A simplifying assumption may be made where all ROI macroblocks are equally weighted. This allows for a simple, two-valued quantization parameter configuration. If different weights for different ROI macroblocks are used, then a multi-valued quantization parameter configuration may be used. However, the technique may remain substantially unchanged.

After the quantization parameters for all macroblocks in the I-frame have been set, operations 500 may then terminate.

FIG. 5b illustrates a flow diagram of operations 550 in setting macroblock quantization parameters of macroblocks of an I-frame based on macroblock flags. Operations 550 may be an implementation of the setting macroblocks quantization parameters based on macroblocks flag, i.e., block 515, of operations 500.

Operations 550 may begin with an encoder, such as encoder 300, selecting a macroblock of the I-frame (block 555). A check may be performed to determine if the selected macroblock has been identified as ROI, i.e., ROIflag=true (block 560). If the selected macroblock has been identified as ROI, i.e., ROIflag=true, then the quantization parameters for the macroblock may be decreased (block 565). The amount of decrease in the quantization parameters may be by a specified value, previously determined to increase image quality without requiring too many additional bits. The specified value may be based on the number of additional bits available for allocation, for example. While if the selected macroblock has been identified as non-ROI, i.e., ROIflag=false, then the quantization parameters for the macroblock may be set at a default value (block 570).

Alternatively, if the selected macroblock has been identified as ROI, i.e., ROIflag=true, then the quantization parameters for the macroblock may be set at a default value, while if the selected macroblock has been identified as non-ROI, i.e., ROIflag=false, then the quantization parameters for the macroblock may be increased.

A check may be determined if there are additional macroblocks that have not had their quantization parameters set (block 575). If there are additional macroblocks, then encoder 300 may return to block 555 to select another macroblock. If there are no additional macroblocks, then operations 550 may then terminate.

Figure 6A:
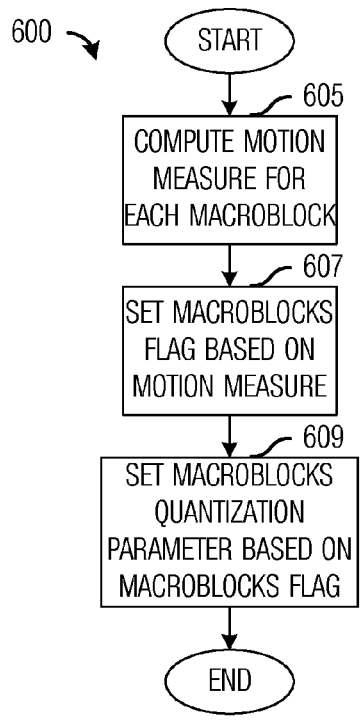
FIG. 6a is a flow diagram of operations in macroblock level bit-allocation for a P-frame.

FIG. 6a illustrates a flow diagram of operations 600 in macroblock level bit-allocation for a P-frame. Operations 600 may be indicative of operations taking place in an encoder, such as encoder 300, as encoder 300 performs a macroblock level bit-allocation for use in encoding a P-frame. Operations 600 may occur each time that a P-frame is received for encoding. Alternatively, operations 600 may occur every n-th P-frame received for encoding. By skipping P-frames, computing resources may be saved at the cost of potentially reducing image quality.

As stated previously, the encoding (and decoding) of a P-frame may be dependent on information from a previous frame, i.e., its reference frame. Therefore, the macroblock level bit-allocation and encoding of a P-frame may be based on both the reference frame as well as the content of the P-frame. If the content of a macroblock does not change between the P-frame and its reference frame, then the encoding of the macroblock may be skipped. The skipping of the encoding of the macroblock is commonly referred as a SKIP mode. This may be especially true for low bit-rate encodings. For example, if a rate-distortion cost (RDcost) function used to choose the use of the SKIP mode for a macroblock is evaluated to a small value, then an algorithm used for encoding a frame may elect to discard a residue signal after the transforming (for example, the discrete cosine transform) and the quantizing of the macroblock. Therefore, no residue will be encoded and transmitted. For decoding, only the macroblock data from the reference frame along with corresponding motion vectors are needed to reconstruct the macroblock. In such a situation, adjustment of quantization parameters, such as quantization step size, may be improper and meaningless.

On the other hand, if the content of the macroblock does change significantly, then the macroblock cannot be skipped and the residue data may need to be quantized. Hence, in macroblock level bit-allocation for P-frames, macroblocks with high motion activity may be defined as ROI.

Operations 600 may begin with a computing of a motion activity measure for each macroblock (block 605). The motion activity may be measured by a statistic of motion vectors in a macroblock. For example, the motion vectors of a macroblock may be summed together to produce the motion activity measure. A motion activity measurement of an i-th macroblock computed as a sum of the motion vectors may be defined as:

$$Sum(|MV|_i) = \frac{1}{N}\sum_{n=1}^{N}(|MV_{i,n}^x| + |MV_{i,n}^y|),$$

where MV are motion vectors, n is a pixel index in the i-th macroblock, and N is the total pixel number in the i-th macroblock.

Furthermore, rather than simply summing up the motion vectors, a weighting may be applied to the motion vectors, wherein the weighting may be based on relative weights of ROIs in the macroblock, for example.

Then, the ROI flag for each macroblock, i.e., ROIflag, may be set based on each macroblock's motion activity measurement (block 607). A criterion for setting the ROI flag of a macroblock may be a specified threshold value that may be dependent on factors such as desired bit-rate, desired image quality, available processing power, and so forth. For example, if a macroblocks motion activity measurement is greater than the specified threshold, then the macroblock may be identified as ROI, else the macroblock may be identified as non-ROI.

The macroblock level bit-allocation may take advantage of ROI information and allocate more resources (bits) to macroblocks identified as ROI, while potentially reducing resources (bits) to macroblocks identified as non-ROI. As discussed previously, allocating more (or less) resources to a macroblock may be realized by adjusting quantization parameters (such as quantization step size, for example) for the macroblock. More resources may be allocated to a macroblock identified as ROI by decreasing the quantization parameters, while fewer resources may be allocated to a macroblock identified as non-ROI by increasing the quantization parameters.

Each macroblock in the P-frame may have its quantization parameters set based on its own ROIflag (block 609). For example, if a macroblock has been identified as ROI, i.e., ROIflag=true, then the quantization parameters for the macroblock may be set at a first level, while if the macroblock has been identified as non-ROI, i.e., ROIflag=false, then the quantization parameters for the macroblock may be set at a second level, where the first level is smaller than the second level.

After the quantization parameters for all macroblocks in the P-frame have been set, operations 600 may then terminate.

Figure 6B:
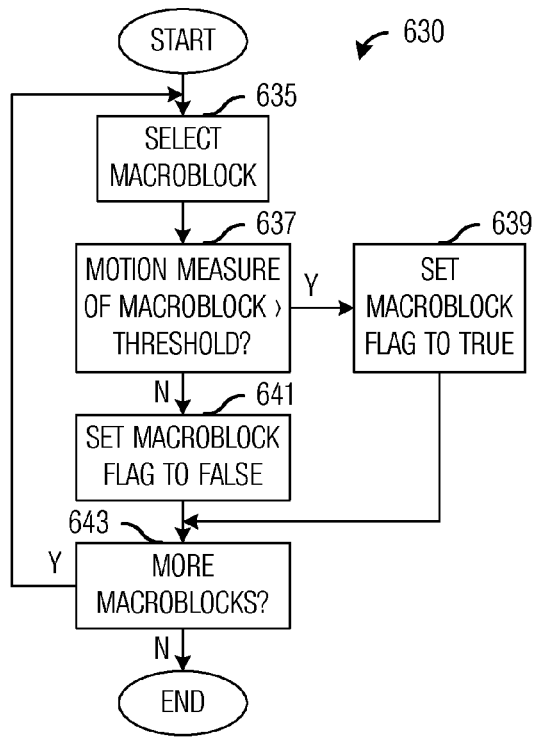
FIG. 6b is a flow diagram of operations in setting a macroblock flag of a P-frame based on motion in the macroblock.

FIG. 6b illustrates a flow diagram of operations 630 in setting a macroblock flag of a P-frame based on motion in the macroblock. Operations 630 may be an implementation of the setting of macroblock ROI flags based on its motion activity measure, i.e., block 607, of operations 600.

Operations 630 may begin with an encoder, such as encoder 300, selecting a macroblock of the P-frame (block 635). A check may then be performed to determine if the motion activity measure, e.g., $$Sum(|MV|_i) = \frac{1}{N}\sum_{n=1}^{N}(|MV_{i,n}^x| + |MV_{i,n}^y|),$$

for the selected macroblock is greater than a threshold (block 637). The threshold that may be dependent on factors such as desired bit-rate, desired image quality, available processing power, and so forth.

If the selected macroblock's motion activity threshold is greater than the threshold, i.e., $Sum(|MV|_i)$>threshold, then there may be a significant amount of motion activity in the selected macroblock and the selected macroblock should be identified as ROI by setting its ROI flag, ROIflag, to true (block 639). If the selected macroblock's motion activity threshold is not greater than the threshold, then there may not be significant motion activity in the selected macroblock and the selected macroblock should be identified as non-ROI by setting its ROI flag to false (block 641).

A check may be determined if there are additional macroblocks that have not had their ROI flags set (block 643). If there are additional macroblocks, then encoder 300 may return to block 635 to select another macroblock. If there are not additional macroblocks, then operations 630 may then terminate.

Figure 6C:
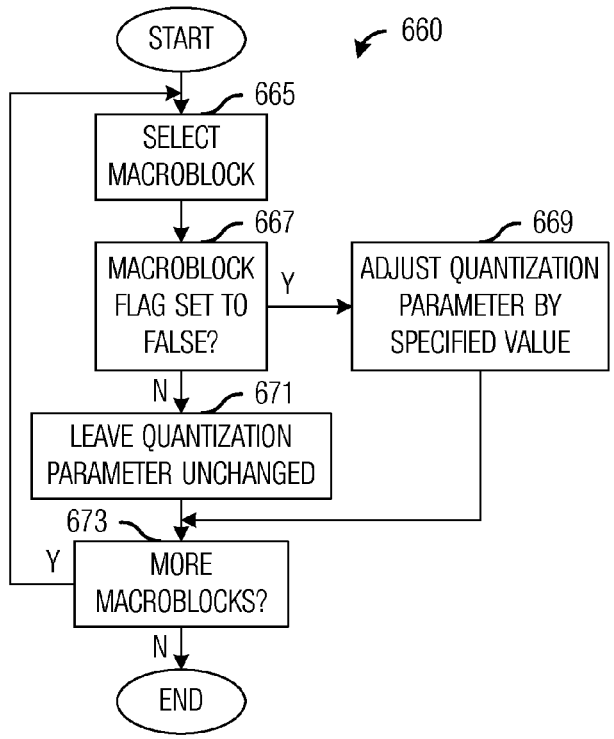
FIG. 6c is a flow diagram of operations in setting macroblock quantization parameters based on macroblock flag.

FIG. 6c illustrates a flow diagram of operations 660 in setting macroblock quantization parameters based on macroblock flag. Operations 660 may be an implementation of the setting macroblocks quantization parameters based on macroblocks flag, i.e., block 609, of operations 600.

Operations 660 may begin with an encoder, such as encoder 300, selecting a macroblock of the I-frame (block 665). A check may be performed to determine if the selected macroblock has been identified as non-ROI, i.e., ROIflag=false (block 667). If the selected macroblock has been identified as non-ROI, i.e., ROIflag=false, then the quantization parameters for the macroblock may be increased (block 669). The amount of increase in the quantization parameters may be by a specified value, previously determined to decrease image quality without significantly impacting image quality. The specified value may be based on the number of additional bits available for allocation, for example. While if the selected macroblock has been identified as ROI, i.e., ROIflag=true, then the quantization parameters for the macroblock may be set at a default value (block 671).

Alternatively, if the selected macroblock has been identified as ROI, i.e., ROIflag=true, then the quantization parameters for the macroblock may be decreased, while if the selected macroblock has been identified as non-ROI, i.e., ROIflag=false, then the quantization parameters for the macroblock may be set at a default value.

A check may be determined if there are additional macroblocks that have not had their quantization parameters set (block 673). If there are additional macroblocks, then encoder 300 may return to block 665 to select another macroblock. If there are not additional macroblocks, then operations 660 may then terminate.

The macroblock level bit-allocation for P-frames may take advantage of what is commonly referred as quality propagation. Quality propagation is a phenomenon wherein if the reference frame of a P-frame is of good quality, i.e., the reference frame has a high PSNR, then it may be likely that the P-frame's quality will also be good. This may especially be true when SKIP mode is being used. This may be due to a copying of macroblock data from the reference frame. Quality propagation allows for a way to improve P-frame quality without incurring additional overhead.

Figure 7A:
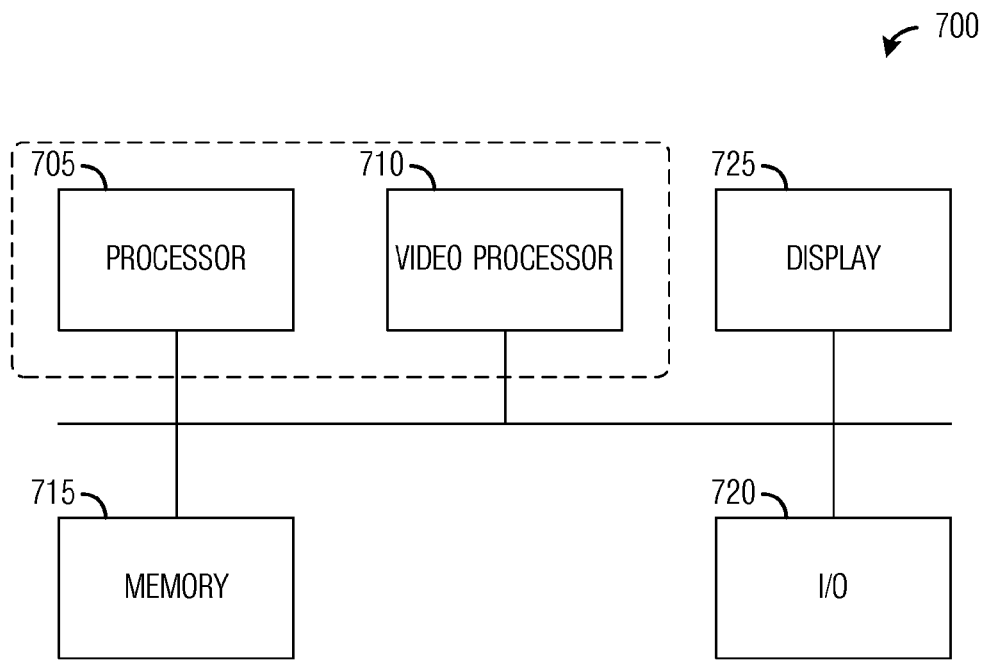
FIG. 7a is a diagram of a video encoding and/or decoding system.

FIG. 7a illustrates a video encoding and/or decoding system 700. Video encoding and/or decoding system 700 may be used for video encoding, video decoding, or both, depending on the capabilities of a video processor included in video encoding and/or decoding system 700. A typical implementation of video encoding and/or decoding system 700 would be capable of performing both video encoding and decoding.

Video encoding and/or decoding system 700 may be used to encode (compress) a video. Compressing the video may reduce storage requirements when the video is to be stored and may reduce transmission bandwidth requirements when the video is to be transmitted. According to the H.264 standard, compressing a video includes applying a discrete cosine transform to the video and then quantizing the coefficients of the output of the discrete cosine transform. Quantizing the coefficients results in the size reduction of the video.

Video encoding and/or decoding system 700 may include a processor 705 that may be used to control the general operation of video encoding and/or decoding system 700. For example, processor 705 may execute an operating system that may serve as an interface between hardware in video encoding and/or decoding system 700 and a user. Processor 705 may also be responsible for performing tasks and operations not specifically involved with video encoding/decoding.

Video encoding and/or decoding system 700 may also include a video processor 710. Video processor 710 may implement algorithms used for video encoding/decoding. Usually, video processor 710 may be implemented in hardware to maximize video encoding/decoding performance. Video processor 710 may be implemented as a separate circuit included in video encoding and/or decoding system 700 or video processor 710 may be integrated into a single integrated circuit with processor 705. In an alternative embodiment, video processor 710 and processor 705 may be integrated into separate integrated circuits, but the separate integrated circuits may be combined into a single module.

Video encoding and/or decoding system 700 may also include a memory 715. Memory 715 may include both volatile and non-volatile memory, with the volatile memory potentially being used to store incoming and outgoing images/video, data generated during video encoding/decoding, program space to store applications as they are being executed, and so forth. While, non-volatile memory may be used to store applications, data, control setting, and so on. Video encoding and/or decoding system 700 may also include an input/output (I/O) unit 720 that may be used to control movement of data, information, programs, user input and commands, and so forth, into and out of video encoding and/or decoding system 700. A display 725 may be used to allow interaction with a user.

The various components of video encoding and/or decoding system 700 may be interconnected via a high-speed connection, such as a communications bus. The communications bus may allow for rapid exchange of applications, image data, and so forth.

Figure 7B:
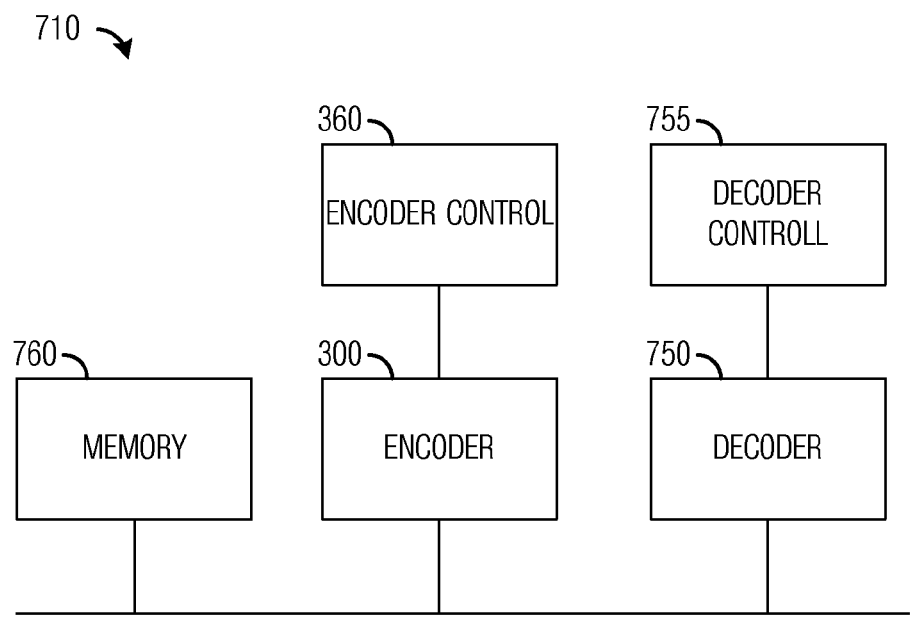
FIG. 7b is a diagram of a video processor.

FIG. 7b illustrates a detailed view of a video processor 710. Video processor 710 may include an encoder 300 that may be controlled by an encoder controller 360. If video processor 710 supports both video encoding and decoding, then video processor 710 may include a decoder 750 and a decoder controller 755. Video processor 710 may also include a memory 760 that may be located in close proximity to encoder 300 and decoder 750. Memory 760 may be used as input and/or output buffers to store image data. Logically, memory 760 may be a part of memory 715.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for encoding an image sequence, wherein the image sequence comprises inter-frames and intra-frames, the method comprising:
grouping the inter-frames and the intra-frames into at least one group of pictures (GOP);

performing a frame-level bit-allocation for the inter-frames and intra-frames in the GOP;

for each frame of the inter-frames and the intra-frames in the GOP,
partitioning the frame into a plurality of macroblocks,
identifying macroblocks in the plurality of macroblocks as having regions of interest (ROI) by applying a ROI identification algorithm to the frame, and marking a macroblock as having ROI in response to determining that the macroblock contains an identified ROI or is part of the identified ROI; and
performing a macroblock level bit-allocation for the frame based on macroblocks identified as having ROI by, for each macroblock in the frame, setting a quantization parameter for the macroblock to a first value in response to determining that the macroblock has been identified as having ROI, and setting the quantization parameter for the macroblock to a second value in response to determining that the macroblock has not been identified as having ROI, wherein the first value is smaller than the second value;

encoding the image sequence based on the bit-allocations, thereby producing an encoded image sequence; and
outputting the encoded image sequence.

2. The method of claim 1, wherein a GOP comprises at least one intra-frame and at least one inter-frame.

3. The method of claim 1, wherein performing a frame-level bit-allocation comprises allocating a number of bits for use in encoding a frame, wherein the number of bits allocated for encoding the frame is based on whether the frame is an inter-frame or an intra-frame.

4. The method of claim 3, wherein a sum of the number of bits allocated to each frame in the GOP is less than or equal to a total number of bits available for allocation.

5. The method of claim 1, wherein the frame is an intra-frame, and wherein the ROI identification algorithm comprises a skin color detection algorithm, a level set segmentation algorithm, a principal component analysis (PCA) algorithm, or a face detection algorithm.

6. The method of claim 1, wherein the frame is an inter-frame, and wherein the ROI identification algorithm comprises a motion activity measure computing algorithm.

7. The method of claim 6, wherein marking a macroblock comprises marking the macroblock as having ROI in response to determining that a motion activity measure for the macroblock exceeds a threshold.

8. The method of claim 1, wherein the quantization parameters comprise a quantization step size.

9. The method of claim 1, wherein outputting the encoded image sequence comprises storing the encoded image sequence in memory, transmitting the encoded image sequence, or displaying the encoded image sequence.

10. The method of claim 1, wherein encoding the image sequence comprises:
transforming the image sequence; and
quantizing the transformed image sequence.

11. The method of claim 10, wherein transforming the image sequence comprises applying a discrete cosine transform to the image sequence.

12. The method of claim 10, wherein quantizing the transformed image sequence reduces a storage requirement of the image sequence.

13. A method for encoding a group of pictures (GOP), wherein the GOP comprises at least one inter-frame and at least one intra-frame, the method comprising:
distributing a total number of encoding bits available to encode the GOP to the inter-frame and the intra-frame;
for each frame in the GOP,
partitioning the frame into a plurality of macroblocks,
identifying macroblocks in the plurality of macroblocks as having regions of interest (ROI) by applying a ROI identification algorithm to the frame, and marking a macroblock as having ROI in response to determining that the macroblock contains an ROI or is part of the ROI, and
distributing an allocated number of encoding bits allocated to encode the frame to the encoding of each macroblock in the plurality of macroblocks, wherein the distributing an allocated number of bits is based on the macroblocks identified as having ROI, and wherein the distributing comprises, for each macroblock in the frame, setting a quantization parameter for the macroblock to a first value in response to determining that the macroblock has been identified as having ROI, and setting the quantization parameter for the macroblock to a second value in response to determining that the macroblock has not been identified as having ROI, wherein the first value is smaller than the second value;
encoding the GOP based on the distributed encoding bits, thereby producing an encoded GOP; and
outputting the encoded GOP.

14. The method of claim 13, wherein the frame is an intra-frame, and wherein the ROI identification algorithm comprises:
detecting a ROI based on image data contained in the frame.

15. The method of claim 13, wherein the frame is an inter-frame, and wherein the ROI identification algorithm comprises:
computing a motion activity measure for each macroblock in the frame; and
determining a macroblock contains an ROI or part of the ROI in response to determining that the macroblock's motion activity measure exceeds a threshold.

16. The method of claim 15, wherein the motion activity measure for a macroblock comprises a sum of motion vectors for image data in the macroblock.

17. The method of claim 13, wherein more bits are allocated to macroblocks having ROI than macroblocks not having ROI.

18. An encoder comprising:
a transform unit (TU) coupled to an input buffer, the TU configured to apply a transform to a residue, wherein the residue is based on image data of a frame provided by the input buffer;
an inverse transform unit (ITU) coupled to the TU, the ITU configured to apply an inverse transform to an output of the TU;
a motion estimation unit (MEU) coupled to the input buffer, the MEU configured to compute motion vectors for the frame provided by the input buffer based on a reference frame;
an intra-frame prediction unit (IPU) coupled to the ITU, the IPU configured to predict intra-frame information based on the frame;
a motion compensation unit (MCU) coupled to the ITU, the MCU configured to generate a description of the frame based on a reference frame and motion present in the frame;
a coding unit (CU) coupled to the TU, the CU configured to encode the frame provided by the input buffer; and
a controller coupled to the TU, the MEU, and the CU, the controller configured to generate control signals to control operation of the encoder, wherein the control signals are based a frame type of the frame provided by the input buffer and regions of interested (ROI) present in the frame, and wherein the controller comprises:

an intra-frame ROI identification unit coupled to the input buffer, the intra-frame ROI identification unit configured to identify ROI in an intra-frame provided by the input buffer, wherein ROI identification is based on image data in the intra-frame;

an inter-frame ROI identification unit coupled to the input buffer, the inter-frame ROI identification unit configured to identify ROI in an inter-frame provided by the input buffer, wherein ROI identification is based on motion present macroblocks of the inter-frame with respect to a reference frame; and a quantization parameter control unit coupled to the intra-frame ROI identification unit and the inter-frame ROI identification unit, the quantization parameter control unit configured to specify quantization parameters for each macroblock of the frame based on ROI identified by the intra-frame ROI identification unit or the inter-frame ROI identification unit.

19. The encoder of claim 18, further comprising a first adder coupled in between the input buffer and the TU, the first adder configured to generate the residue by subtracting the predicted intra-frame information from the IPU or the description of the frame from the MCU from the frame provided by the input buffer, wherein the subtraction is based on the frame type of the frame provided by the input buffer.

20. The encoder of claim 18, further comprising a second adder coupled in between the ITU and the MCU and the IPU, the second adder configured to combine the residue with the predicted intra-frame information from the IPU or the description of the frame from the MCU, wherein the combining is based on the frame type of the frame provided by the input buffer.

21. The encoder of claim 18, wherein the controller further comprises a group of picture forming unit coupled in between the input buffer and the intra-frame ROI identification unit and the inter-frame ROI identification unit, the group of picture forming unit configured to group frames provided by the input buffer into groups of pictures.

22. The encoder of claim 18, wherein the TU, the ITU, the MEU, the IPU, the MCU, the CU, and the controller are all formed on a single silicon substrate.

* * * * *